United States Patent
Turbin

(10) Patent No.: US 9,588,829 B2
(45) Date of Patent: Mar. 7, 2017

(54) SECURITY METHOD AND APPARATUS DIRECTED AT REMOVABLE STORAGE DEVICES

(75) Inventor: Pavel Turbin, Jokela (FI)

(73) Assignee: F-Secure Oyj, Helsinki (FI)

( * ) Notice: Subject to any disclaimer, the term of this patent is extended or adjusted under 35 U.S.C. 154(b) by 656 days.

(21) Appl. No.: 12/660,826

(22) Filed: Mar. 4, 2010

(65) Prior Publication Data

US 2011/0219453 A1    Sep. 8, 2011

(51) Int. Cl.
*G06F 21/00*    (2013.01)
*G06F 11/00*    (2006.01)

(52) U.S. Cl.
CPC .............. *G06F 11/00* (2013.01); *G06F 21/00* (2013.01)

(58) Field of Classification Search
CPC ................................. G06F 11/00; G06F 21/00
USPC ....................................... 726/22–25
See application file for complete search history.

(56) References Cited

U.S. PATENT DOCUMENTS

| 5,657,445 | A  | * | 8/1997  | Pearce ............................ 726/23  |
| 6,357,008 | B1 | * | 3/2002  | Nachenberg .................... 726/24 |
| 6,842,861 | B1 | * | 1/2005  | Cox et al. ...................... 713/188 |
| 7,823,205 | B1 | * | 10/2010 | Isenberg et al. ................. 726/23 |
| 8,713,686 | B2 | * | 4/2014  | Kane ................................ 726/26 |
| 2001/0020272 | A1 | * | 9/2001  | Le Pennec et al. .......... 713/200 |
| 2002/0166059 | A1 | * | 11/2002 | Rickey et al. ................ 713/200 |
| 2006/0236399 | A1 | * | 10/2006 | Han ................................ 726/24 |
| 2008/0288766 | A1 | * | 11/2008 | Inoue et al. ...................... 713/2 |
| 2009/0070598 | A1 | * | 3/2009  | Cromer et al. ................ 713/193 |
| 2009/0293126 | A1 | * | 11/2009 | Archer et al. .................. 726/24 |
| 2010/0262802 | A1 | * | 10/2010 | Goebel et al. ................ 711/166 |

OTHER PUBLICATIONS

"IEEE 100: The Authoritative Dictionary of IEEE Standard Terms", Seventh Edition, 2000, pp. 298, 339, 709-710.*

* cited by examiner

*Primary Examiner* — John B King
(74) *Attorney, Agent, or Firm* — Harrington & Smith

(57) ABSTRACT

A method of protecting a computer against malware infection. The method includes during operation of the computer, reading master boot record code from a removable storage device into the computer and inspecting said code to identify any instructions associated with suspicious behaviour. In the event that suspicious instructions are identified, the master boot record code on the removable storage device is modified and/or the behaviour of the computer adapted in order to prevent said master boot record code installing malware into the computer. Examples of suspicious behaviour include hard disk read or write operations.

15 Claims, 2 Drawing Sheets

SECURITY METHOD AND APPARATUS DIRECTED AT REMOVABLE STORAGE DEVICES

TECHNICAL FIELD

The present invention relates to a method and apparatus for providing security directed at computers and computer systems configured to receive removable storage devices. More particularly, the invention relates to a method and apparatus for securing such computers and computer systems against malware infection from removable storage devices.

BACKGROUND

"Malware" is a term used to define malicious software that can be unwittingly installed on computers and computer systems. Whilst the term encompasses viruses, trojans, spyware etc, it is often used interchangeably with the term "computer virus" or "virus. Malware can be used by an attacker, for example, to disrupt normal computer operation, to take control of a computer, or to collect confidential user information such as bank login details. In order to defend against malware attacks, a computer user may install an anti-virus application such as, for example, F-Secure Internet Security™. Such applications employ a number of techniques to detect malware including searching for fingerprints of known viruses, and analysing device and/or software behaviour (including using rules or "heuristics" to identify suspicious behaviour).

Today, the majority of malware infections arise as a result of so-called "drive-by" downloads. This type of attack starts with a computer user directing his or her web browser to a website that is controlled by an attacker or which is otherwise compromised. The code that is downloaded into the web browser includes code that either contains the malware or directs the browser to another internet site from which the malware is downloaded. Infection may also result from a user loading a disk (e.g. CD, DVD, etc) into a computer or plugging into the computer a removable storage device such as a USB stick, with the malware or installation code (which directs the computer to download malware from an Internet site) being present on the disk or other removable storage device. Whilst users can to a large extent protect themselves against drive-by download attacks, i.e. by visiting only trusted sites and/or avoiding suspicious sites, they may be more vulnerable to attacks associated with removable storage devices, particularly as they may believe that conventional anti-virus application will always prevent virus infection by scanning such devices prior to installing data or software from them. This is especially true in the case of USB devices as these may be presumed to be more trustworthy than disks. Reliance by an attacker on a typical but mistaken assumption on the part of users is often termed "social engineering".

Considering further an attack involving a removable storage device, in order to gain the upper hand over anti-virus applications, an attacker may seek to compromise the contents of the master boot record (MBR) stored on the device. The MBR is the 512-byte boot sector that is the first sector ("LBA Sector $0$") of a partitioned data storage device. In the case of a computer's hard disk drive, the MBR is that sector that the BIOS (stored in RAM memory) looks to first for instructions, when the computer is booted. Whilst the BIOS is usually configured to look first at the MBR of the computer's hard disk drive, in some cases it is possible for the BIOS to look first to a removable storage device to see if it contains an MBR. Benign removable storage devices do often contain an MBR, but the MBR code is typically trivial, for example merely directing the computer to display on the device screen a message advising the user to remove the device and reboot the computer. Of course, by inserting malicious code into a device's MBR, an attacker may be able to install malware into the computer itself. This malware might be an MBR infection of the computer hard disk drive, e.g. similar to the "MebRoot" trojan, or a more conventional form of malware.

SUMMARY

It is an object of the present invention to provide an improved defence against computer malware infection arising from a removable storage device. This object is achieved by inspecting the contents of MBR code of a removable storage device during normal operation of a computer to which the device is attached, in order to identify suspicious MBR code, and taking appropriate action to prevent cross infection if such suspicious code is identified.

According to a first aspect of the present invention there is provided a method of protecting a computer against malware infection. The method comprises, during operation of the computer, reading master boot record code from a removable storage device into the computer and inspecting said code to identify any instructions associated with suspicious behaviour. In the event that suspicious instructions are identified, the master boot record code on the removable storage device is modified and/or the behaviour of the computer adapted in order to prevent said master boot record code installing malware into the computer. Examples of suspicious behaviour include hard disk read or write operations.

The invention is applicable, for example, to removable storage devices such as USB devices. The method may comprise identifying mounting of the USB device and subsequently performing the step of reading the master boot record code from the device.

The step of inspecting said code to identify any instructions associated with suspicious behaviour may comprise identifying within the code instructions or instruction sequences that match with instructions or instruction sequences contained within a database maintained in a memory of the computer.

In the event that the MBR code stored on the device is in the form of machine code, the method may comprise disassembling the machine code into assembly code.

In the event that the master boot record is to be modified, the modification may comprise replacing the master boot code with a known, harmless master boot code. This may involve copying the master boot code from the removable storage device into a memory of the computer, and restricting access to the stored code.

In the event that the behaviour of the computer is to be adapted, the adoption may comprise one of:
displaying a warning message on a display of the computer;
determining a boot sequence of the computer and, if the
   removable storage device is first in the boot sequence, changing the boot sequence to boot first from another device; and
at shutdown or reboot of the computer, displaying a warning message on a display of the computer.

According to a second aspect of the present invention there is provided computer program for causing a computer to read into the computer a master boot record code from a removable storage device. The read code is then inspected to identify any instructions associated with suspicious behaviour, and, in the event that suspicious instructions are identified, the master boot record code is modified on the removable storage device and/or the behaviour of the computer adapted in order to prevent said master boot record code installing malware into the computer.

According to a third aspect of the present invention there is provided a computer program storage medium having stored thereon a computer program according to claim above second aspect of the invention.

According to a fourth aspect of the present invention there is provided computer comprising a code retrieval unit for reading master boot record code from a removable storage device into the computer. A scanning unit is provided for scanning the read code to identify any instructions associated with suspicious behaviour. Further, an action unit is provided and configured, in the event that suspicious instructions are identified, to modify the master boot record code on the removable storage device and/or adapt the behaviour of the computer in order to prevent said master boot record code installing malware into the computer.

The computer may comprise a memory storing instructions and/or instruction sequences identified as suspicious, said scanning unit being configured to scan the read code for the presence of any of these instructions and/or instruction sequences.

The action unit may be configured to modify the master boot record code on the removable storage device by overwriting the existing code with known, harmless code.

Alternatively, the action unit may be configured, in the event that the behaviour of the computer is to be adapted, to:
- display a warning message on a display of the computer;
- determine a boot sequence of the computer and, if the removable storage device is first in the boot sequence, change the boot sequence to boot first from another device; and
- at shutdown or reboot of the computer, display a warning message on a display of the computer.

DETAILED DESCRIPTION

Figure 1:
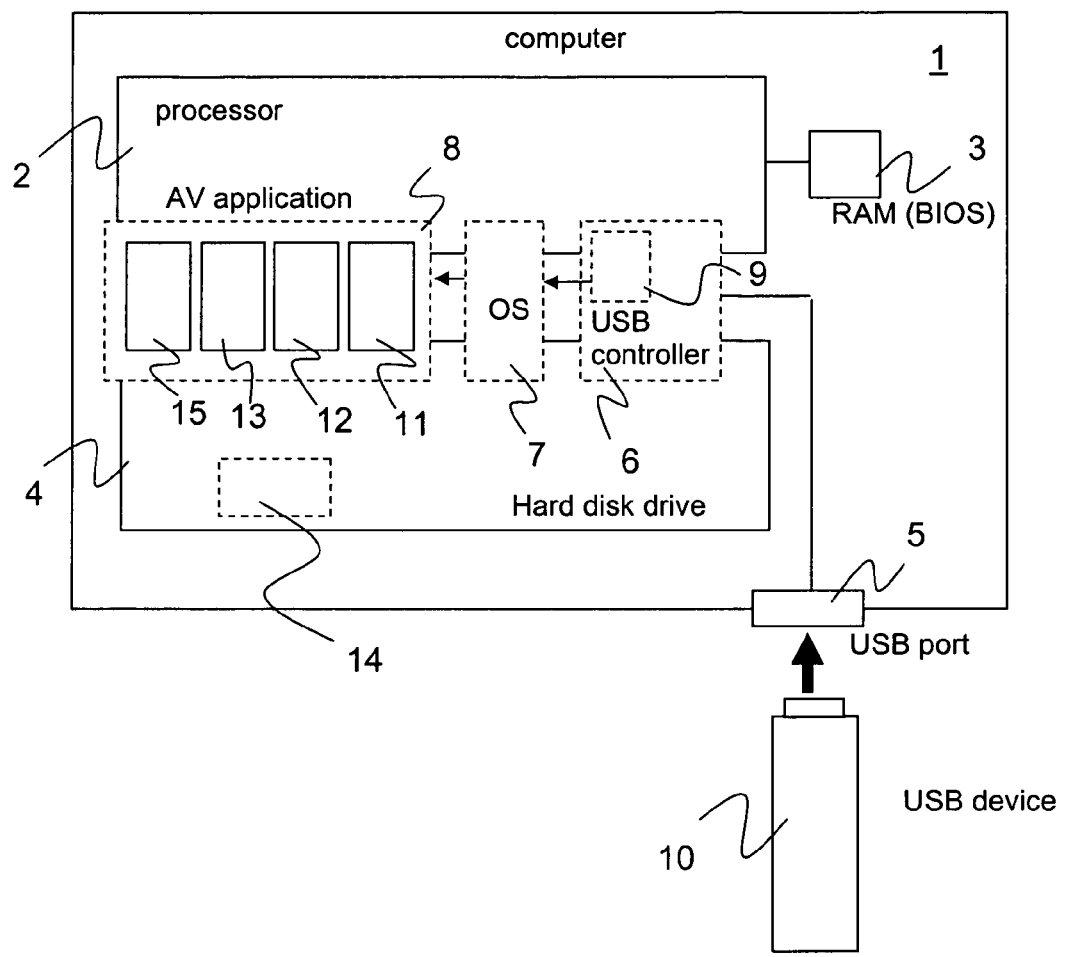
FIG. 1 illustrates a computer including security units for protecting the computer against cross-infection from a USB memory device.
Figure 2:
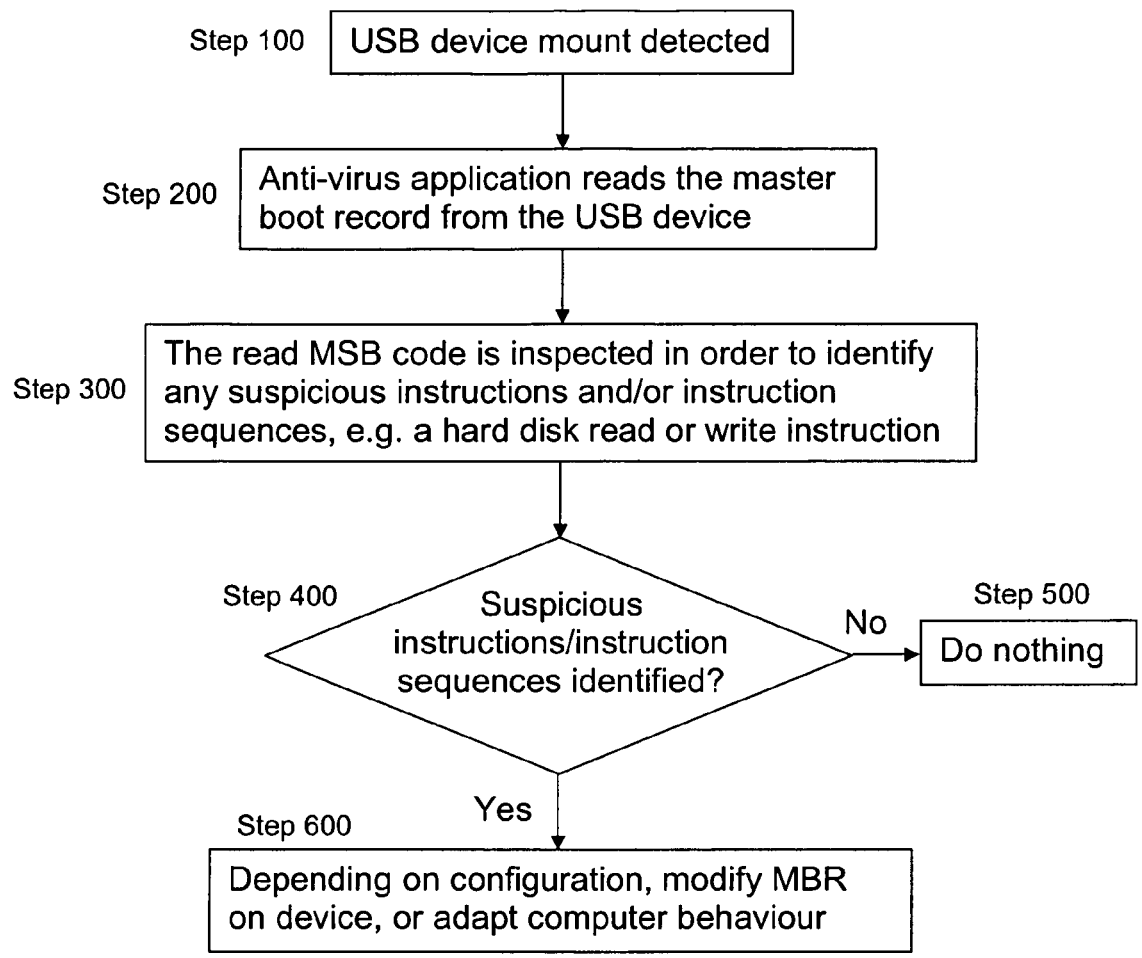
FIG. 2 is a flow diagram showing a method of operating the computer of FIG. 1 in order to implement the protection.

In view of the current popularity of USB flash memory devices, a new opportunity for spreading malware between computers is presenting itself to attackers. This threat is posed not only to desktop PCs and laptops, but also to mobile phones, smart phones, PDAs, notepads, and the like, as well as to entire computer systems. Such devices are intended to facilitate the easy transfer of files and other data between computers and thus represent an ideal channel for the distribution of malware. As well as USB memory sticks and cards, attackers may take advantage of other USB connectable memory devices that are "mounted" as external drives, including mobile phones, cameras, etc.

USB memory devices may or may not contain a Master Boot Record (MBR). If an MBR record is provided, it will always be at the "zero" memory location. In most flash memory cards, if an MBR is present it appears that this is a dummy MBR that is not intended to be used as a boot "disk".

In the case that a computer attempts to boot from a USB device, such a dummy MBR may for example cause the display of a message that the USB boot attempt was inappropriate. The computer will then attempt to boot from the next designated device, e.g. the hard disk drive. It can however be fairly easy to overwrite an existing MBR on a USB memory device, or to create one where it does not already exist. For example, a compromised computer can achieve this in such a way that the attack is hidden from the user. An attack using a compromised USB memory device can be effectively hidden from the user as it occurs during boot time, without requiring any "manual" program execution by the user. Furthermore, infections on MBR records are difficult to identify using normal operating system tools, as the MBR is a special sector that can only be viewed using direct disk operations.

An analysis of MBR code on typical USB memory devices shows that the code, if present, is both trivial and relatively short (e.g. 33h bytes). This is to be expected as such devices are intended to operate merely as data storage devices. Such code is apparently harmless to the local computer. On the other hand, MBR code contained on a bootable USB memory device and is very different from the simple non-bootable code. Rather, the bootable code is lengthy and actively interoperates with the local hard disk drive. The presence of this type of code on a USB memory device can perhaps be considered surprising, or at least unusual.

Using an assumption that simple MBR code is expected whilst complex code is unexpected, one can define a method of protecting computers from cross infection arising from removable storage devices. This employs the following steps:

1. A user plugs a USB memory device into a computer, where the computer is powered-up and operating normally.
2. An anti-virus application running on the computer notices a new disk was inserted. This can be achieved using a filter driver which generates a mount disk notification.
3. The anti-virus application will likely ignore mount of CD or DVD disks, and only activates the boot protection method when it is notified of a USB memory device mount. [Whilst the protection method can also be activated by CD and DVD disk mounts, this may be undesirable as such disks will often validly contain bootable MBRs, leading in turn to a high proportion of false positives.]
4. The anti-virus application reads and disassembles the MBR of the attached USB memory device, assuming, as is typical, that the MBR code is in the form of machine code instructions. [In the event that there is no MBR at memory location zero, the anti-virus application will recognise this and terminate the MBR scan.]
5. The anti-virus application analyzes the disassembled MBR instructions of the USB drive and recognizes the active boot code. The anti-virus application has a database of suspicious actions, and scans the code to determine if any of these are present. An example of a suspicious action may be the presence of instructions requiring reading and writing to the local hard drive (e.g. INT 13h).
6. The detection of a suspicious instruction in the MBR code causes the anti-virus application to take certain defensive action. This can include one (or more) of the following actions, depending upon product configuration:

a) The anti-virus application causes a warning message to be displayed on the computer's display, indicating that the inserted device contains active boot code. This option can be used for example where an advanced user is expected, e.g. network administrator. The user then has the option to leave the device installed (and boot from the device if appropriate), remove it, or possibly modify the MBR on the device.

b) The anti-virus application saves a copy of the MBR from the inserted USB into a local quarantine, and replaces the MBR on the device with a dummy MBR. Such an action might be appropriate in highly restricted environments such as banks.

c) The anti-virus application determines the current boot sequence of the local computer, e.g. (1) local-hard drive, (2) CDROM, (3) USB device. If the boot sequence starts with the local hard drive, then the anti-virus application takes no further action as the inserted disk is harmless for this computer. If on the other hand the boot order starts with the USB device, then the anti-virus application changes the boot sequence to start the boot from the local hard disk. Alternatively, action a) or b) may be applied in this case. Action c) may be employed in an open and insecure environment such as an Internet café.

d) The anti-virus application does not take any immediate action. However, if the USB device remains plugged into the local computer when a system reboot/shutdown occurs, then the anti-virus application blocks the reboot/shutdown sequence and offers the user an opportunity to unplug the device. If the user has inserted a legitimate bootable USB device he or she can ignore this warning. Action d) might be appropriate for users using their own (home) computers.

Of course, an anti-virus application may combine actions a) to d) as appropriate.

In order to reduce the risk of false positives, the anti-virus application may check the MBR code to determine if it corresponds to code known to be safe. For example, the application may examine the code to determine if it is associated with a legitimate operating system installer. It may do this by examining the content of the root directory, e.g. to examine folder windows and boot runtime files (ntldr, ntoskrn.exe, etc).

FIG. 3 illustrates schematically a computer 1 configured to implement the approach(es) described above. The computer comprises one or more processors 2, a RAM memory 3, and a hard disk drive 4. In addition, the computer comprises a USB port 5 connected, internally, to a USB controller 6. The USB controller may be implemented in whole or in part by software instructions running on the processor(s) 2. An operating system, for example a Windows™ operating system 7, is implemented by code stored on the hard disk drive 4 running on the processor 2. Code implementing a BIOS is stored in the RAM 3. An anti-virus application 8 is also implemented in use by code, stored in the hard disk drive 4, running on the processor.

The controller 6 comprises an interrupt unit 9 that informs the operating system 7 when an external USB device 10 has been plugged into the USB port 5. This interrupt is passed to the anti-virus application 8. The anti-virus application comprises an MBR code retrieval unit 11 for retrieving MBR code stored on the USB device 10 when an interrupt is received. The retrieved code is passed to a disassembler 12 which is configured to convert the machine code instructions into assembly code. A scanning unit 13 in turn receives the disassembled code from the disassembler, and scans the code for suspect instructions. The anti-virus application may make use of signatures and/or other features to identify suspect as well as trusted MBR code. This information is stored in a memory portion 14 of the hard disk drive 4. The scanning unit provides a result, e.g. trusted, malicious, suspicious, etc, to an action unit 15. The action unit 15 is configured to take appropriate action depending upon the result that is determined. This may be one of the actions considered above (6 a) to d)).

FIG. 4 is a flow diagram illustrating the approach described above, and which may be implemented using the apparatus of FIG. 3. At step 100, the computer detects mounting of the external USB memory device. The anti-virus application is notified of this event, and at step 200 reads the MBR code from the device. The read code is inspected at step 300 to determine whether or not it contains any suspicious instructions or instruction sequences. A decision is made at step 400 based upon the result of the inspection. If no suspicious instructions are present, then no further action is taken, step 500, and the scanning process is terminated (pending mounting of a new device). If, however, suspicious instructions are detected, then at step 600 protection actions are taken, as discussed above.

It will be appreciate by those of skill in the art that various modifications may be made to the above described embodiments without departing from the scope of the present invention. For example, whilst the above discussion has been concerned primarily with USB memory devices, the invention may also be employed to protect against booting from other devices including, for example, CD and DVD disks and memory cards (particularly applicable to mobile phones). According to another modification, the anti-virus application may be configured to analyse the machine code MBR directly, without requiring disassembling. This is possible as there is a one to one mapping between machine code and assembly language instructions.

The invention claimed is:

1. A method of protecting a computer against malware infection, the method comprising:

running an anti-virus application on the computer after the computer has booted from a local hard drive into an operating system;

informing the booted up operating system of the computer of an occurrence of a mounting of a removable storage device by providing an interrupt to the operating system and passing this interrupt to the anti-virus application and, in response, the anti-virus application reading master boot record code from a first sector of the removable storage device into the computer;

inspecting by the anti-virus application said master boot record code to identify any instructions requiring reading or writing to the local hard drive; and when instructions requiring reading or writing to the local hard drive are identified by the anti-virus application based upon the inspecting, modifying by the anti-virus application the master boot record code on the removable storage device or adapting behaviour of the computer in order to prevent said master boot record code installing malware into the computer and allowing use of the removable storage device.

2. The method according to claim 1, wherein said removable storage device is a USB device.

3. The method according to claim 1, wherein said step of inspecting by the anti-virus application said master boot record code to identify any instructions requiring reading or writing to the local hard drive comprises identifying within the master boot record code instructions or instruction sequences that match with instructions or instruction sequences contained within a database maintained in a memory of the computer.

4. The method according to claim 1, wherein said step of inspecting by the anti-virus application said master boot record code comprises disassembling machine code into assembly code.

5. The method according to claim 1, wherein, in the event that the master boot record code is to be modified, the modification comprises replacing the master boot record code with a known, harmless master boot record code.

6. The method according to claim 5, further comprising copying the master boot record code from the removable storage device into a memory of the computer, and restricting access to the copied master boot record code.

7. The method according to claim 1, wherein, in the event that the behaviour of the computer is to be adapted, the adaption comprises one of:
- displaying a warning message on a display of the computer;
- determining a boot sequence of the computer and, if the removable storage device is first in the boot sequence, changing the boot sequence to boot first from another device; and
- at shutdown or reboot of the computer, displaying the warning message on the display of the computer.

8. The method according to claim 1, wherein said removable storage device is a USB device mounted to an external USB slot of the computer.

9. The method according to claim 1, wherein the occurrence of a mounting of a removable storage device comprises plugging a USB memory device into the computer after the computer is powered-up and operating normally.

10. The method according to claim 1, wherein the occurrence of a mounting of a removable storage device comprises powering-up the computer and operating normally thereafter before a user plugs a USB memory device into the computer.

11. A non-transitory computer program storage medium having stored thereon therein a computer program for causing a computer to:
- run an anti-virus application on the computer after the computer has booted from a local hard drive into an operating system;
- inform the booted up operating system of the computer of an occurrence of a mounting of a removable storage device by providing an interrupt to the operating system and passing this interrupt to the anti-virus application and, in response, the anti-virus application reading into the computer a master boot record code from the removable storage device;
- inspecting by the anti-virus application said master boot record code to identify any instructions requiring reading or writing to the local hard drive; and
- when instructions requiring reading or writing to the local hard drive are identified by the anti-virus application based upon the inspection, modifying by the anti-virus application the master boot record code on the removable storage device or adapt behaviour of the computer in order to prevent said master boot record code installing malware into the computer and allowing use of the removable storage device.

12. A computer comprising:
- a booted-up operating system from a local hard drive, upon receiving an interrupt for identifying an occurrence of a mounting of a removable storage device, is configured to generate a mount disk notification by the booted up operating system of the computer; a code retrieval unit, responsive to said mount disk notification, for reading master boot record code from the removable storage device into the computer;
- a scanning unit for scanning the read master boot record code to identify any instructions requiring reading or writing to the local hard drive; and
- an action unit configured, when instructions requiring reading or writing to the local hard drive are identified based upon the scanning, to modify the master boot record code on the removable storage device or adapt behaviour of the computer in order to prevent said master boot record code installing malware into the computer and allowing use of the removable storage device.

13. The computer according to claim 12, further comprising a memory storing instructions or instruction sequences identified as requiring reading or writing to the local hard drive, said scanning unit being configured to scan the read master boot record code for the presence of any of these instructions or instruction sequences.

14. The computer according to claim 12, wherein said action unit being configured to modify the master boot record code on the removable storage device by overwriting the existing master boot record code with known, harmless master boot record code.

15. The computer according to claim 12, wherein said action unit is configured, in the event that the behaviour of the computer is to be adapted, to:
- display a warning message on a display of the computer;
- determine a boot sequence of the computer and, if the removable storage device is first in the boot sequence, change the boot sequence to boot first from another device;
- and at shutdown or reboot of the computer, display the warning message on the display of the computer.

* * * * *